United States Patent [19]

Luebs et al.

[11] 3,726,328
[45] Apr. 10, 1973

[54] METHOD FOR MAKING TEXTURED PANELS

[75] Inventors: Donald F. Luebs, Vienna, Va.; Frederick R. Ashby, Red Oak Ridge, N.Y.

[73] Assignee: Champion International Corporation, New York, N.Y.

[22] Filed: Feb. 25, 1971

[21] Appl. No.: 118,666

Related U.S. Application Data

[62] Division of Ser. Nos. 759,624, Sept. 13, 1968, and Ser. No. , , Division of Ser. No. 35,011, May 6, 1970, Pat. No. 3,616,826, and Ser. No. , , Division of Ser. No. 118,665.

[52] U.S. Cl..................144/323, 144/309 A, 144/136
[51] Int. Cl. ..............................................B27m 3/08
[58] Field of Search......................144/320, 323, 326, 144/328, 309 A, 309 R, 136, 13

[56] References Cited

UNITED STATES PATENTS

| 585,886 | 7/1897 | Lerch | 144/13 |
| 857,738 | 6/1907 | Karstens | 144/136 R |
| 945,373 | 1/1910 | Brook | 144/2 R |
| 1,629,742 | 5/1927 | Scott | 144/136 R |

*Primary Examiner*—Donald R. Schran
*Attorney*—James M. Heilman and Heilman & Heilman

[57] ABSTRACT

This invention pertains to the method, and/or apparatus for rapidly producing the same so that fibrous board products including plywood panels would appear to simulate an adze surfaced product having a rustic appearance. The "distressing" or cutting of the product may be minimal or partial distressing or may be total distressing including overlapping cuts, or cuts within previous cuts.

4 Claims, 6 Drawing Figures

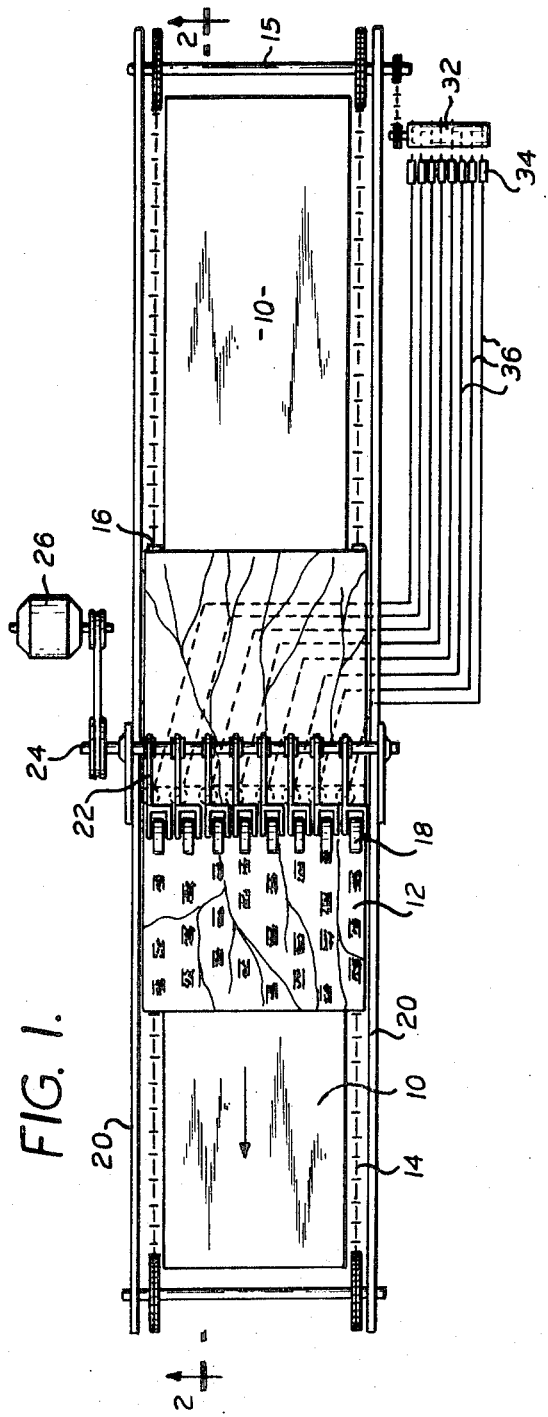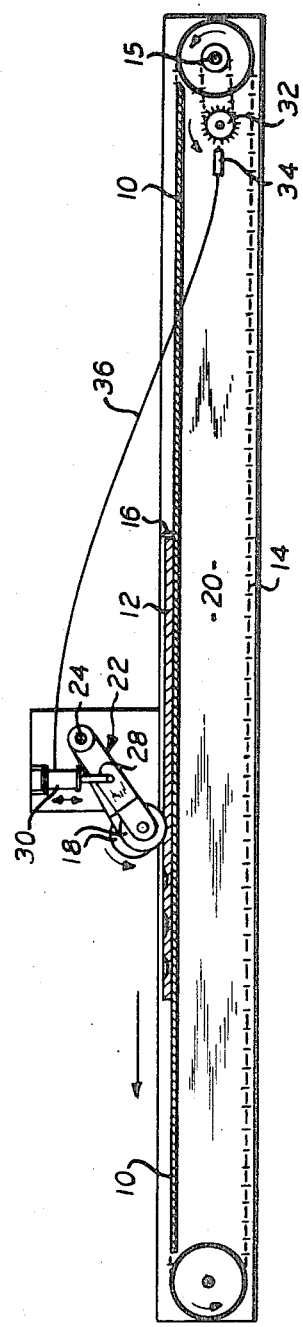

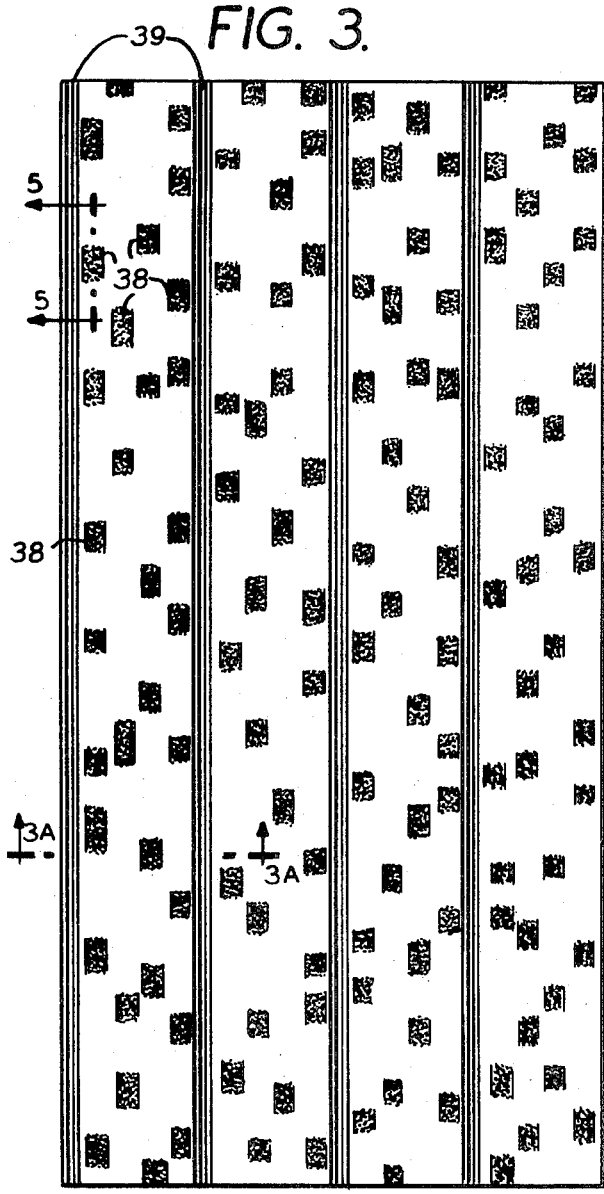
FIG. 3.
FIG. 3A.
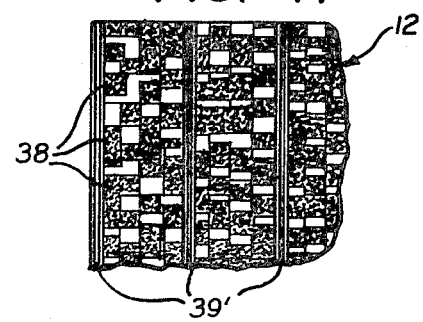
FIG. 4.
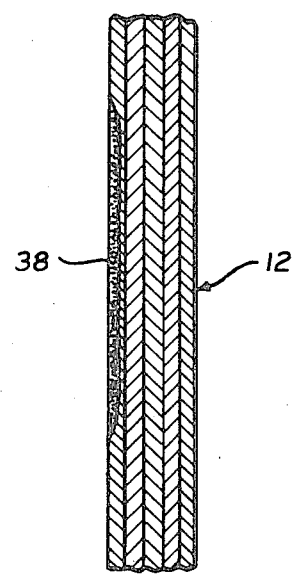
FIG. 5.
INVENTORS
DONALD F. LUEBS
FREDERICK R. ASHBY
BY
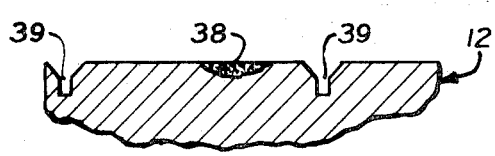
ATTORNEY.

3,726,328

METHOD FOR MAKING TEXTURED PANELS

RELATED APPLICATIONS

This application is a division of parent application S.N. 759,624, filed Sept. 13, 1968, and copending application S.N. 35,011, filed May 6, 1970, now U.S. Pat. No. 3,616,826, granted Nov. 2, 1971, and application S.N. 118,665, filed herewith, all of which are incorporated herein by reference, and all assigned to the same assignee hereof.

This invention pertains to a textured panel simulating preferably a rough hewn product, and the method, and apparatus for rapidly producing the same so that the wood fiber boards including plywood panels would appear to simulate an adze surfaced product having a rustic appearance. The distressing or cutting of the product may be minimal or partial distressing or may be total distressing including overlapping cuts, or cuts in cuts.

The hand hewn effect is simulated by feeding plywood panels (which is understood to include all types of fibrous boards) longitudinally under transversely spaced rotary cutters having respective lifting mechanisms controlled by a programming device.

BACKGROUND

There is a growing demand for textured panels having a surface effect simulating the rustic effect of the hand hewn appearance of old beams and old planks which were hewn out of logs by hand with an axe or adze.

This invention is applicable to any fibrous product, particularly of wood such as plywood, lumber, hardboard, particle board and the like, and has one of its most effective uses in exterior plywood siding panels.

The number of cuts made in a panel or board may range from two to three cuts per square foot of surface area to cuts which cover the entire surface, and including double cuts in certain areas.

SUMMARY

According to the present invention, an interior or exterior wood or plywood panel or siding to be textured is passed lengthwise with respect to transversely spaced tools stationed along the path of the panel. The tools are advanced intermittently toward the moving panel to distress spaced areas of the adjacent surface in a suitable pattern. Preferably the tools are rotated about transverse axes above the moving panel, and individually pneumatically, hydraulically, or electronically, advanced toward the moving panel. The advance of the tools toward the moving panel is preferably program controlled as, for example, by a program cylinder driven by the panel moving means.

DRAWINGS

FIG. 1 is a plan view of a preferred embodiment of apparatus according to, and for carrying out the method of, the present invention;

FIG. 2 is a vertical longitudinal section taken along the line 2 — 2 of FIG. 1;

FIG. 3 is a plan view of a plywood panel partially distressed by the invention;

FIG. 3A is a cross sectional view taken on the line 3A — 3A of FIG. 3;

FIG. 4 is a partial plan view of a portion of a totally distressed panel; and

FIG. 5 is an enlarged longitudinal section taken on line 5 — 5 of FIG. 3 showing a five ply panel having the face veneer distressed by the invention.

DESCRIPTION OF ONE PREFERRED EMBODIMENT

As shown in FIGS. 1 and 2, the machine comprises a bed 10 which supports a plywood panel workpiece 12 of three, five or more plies, and having on each side a conveyor chain 14 driven through a common shaft by a conventional motor (not shown). The chain 14 is provided with dogs 16 for engaging the rear edge of the panel for feeding the panel along the bed 10 to pass under a transversely spaced series of cutting means, such as cutter heads 18. A fence 20 on each side of the bed 10 is adjustable for alignment of different widths of work.

The cutter heads 18, which may be of the same or different widths, are journaled on the ends of arms 22 pivoted on a drive shaft 24 driven by a motor 26. The cutter heads 18 are driven from the shaft 24 by belts not shown for sake of clarity. The arms 22 are connected to piston rods 28 for pneumatic cylinders 30, whereby the cutter heads 18 may be periodically lifted when so desired by a programmed cylinder 32 driven from the shaft 15 and connected to microswitches 34 operating through air lines 36 to actuate the pistons of the pneumatic cylinders 30. This mechanism may be, for example, similar to that of a player piano.

The operation, as the cutter heads descend (as shown in FIGS. 3, 4, and 5) these cutter heads gouge out areas 38 in the panel 12, which produce a textured appearance in the panel, simulating the adze marks in a hand hewn beam. The nature of the individual cuts in this process can be varied through several means. The length of the cut depends upon the time interval in which the cutter head is held in engagement against the panel, as well as the speed of the panel feed. The width is determined by the width of the knives in the cutter used, or the shape of the knives may be varied or they may be patterned to provide a textured cut. The transverse spacing of the cutter heads obviously may be varied. Certain of said cuts will be formed in the original surface of the panel sometimes leaving large areas uncut. Other cuts will be formed within and overlapping previous cut-out sections, i.e., cuts in cuts.

As mentioned above, the individual single cut-out portions may vary greatly depending upon individual preference. It has been found that one-half to three inches in length, preferably about three inches, one-half to three inches in width, and one thirty-second to three-sixteenths inch in depth, preferably about one-eighth inch, to be particularly effective.

If desired, large flat panels may be grooved at regularly or irregularly spaced intervals as illustrated in FIG. 3A by grooves 39, or by "V" grooves 39' as illustrated in FIG. 4.

For the information of the Examiner, a representative advertisement of the new products ("Oldbridge," trademark of assignee U.S. Plywood-Champion Papers Inc.) made by this invention is attached hereto as Exhibit F which illustrate more dramatically than the drawing the startling effects achieved by the invention either in the rough or with various appropriate stains and/or finishes applied thereto.

Also the tearout which occurs along the rear edge of the cut will vary somewhat depending on the characteristics of the wood. Furthermore, the multiple, rotating cutter heads as described up to this point may be substituted by ganged saw blades (similar to dado heads), rotating abrasive heads, or by fixed knives (scrapers) to be brought into engagement against the panel according to a predetermined pattern similar to that used with the cutter heads. Furthermore, a number of knives may be affixed in an elongated cutter head (similar to a planing machine) which would rotate to scoop or gouge out a pattern of cuts according to placement of the knives. Also, the simulated adze marks may be produced by the removal of material through sand blast or shot blast, with or without a stencil or mask, or by hot or cold embossing of the surface by hot or cold dies, rolls, or platens.

Preferably, a second, third or fourth series of distressing tools (not shown for sake of clarity), with different height of cutting edge to produce varying depth of cuts can be positioned along the face of the panel to make as many marks in the panel of whatever pattern desired. While most of the cuts will gouge out the wood, other cuts may be employed, alone or in combination with the gouges, which merely mark, compress, or slit the wood, said marks, compressed areas, and slitted areas being of various depth, length, and width suitable to produce the desired effect. Also to further randomize the pattern, if desired, the banks of cutter heads may be oscillated in a slight side to side motion.

The embodiments of the invention in which an exclusive property or privilege is claimed are defined as follows:

1. A method of treating the surface of a wood panel to simulate a textured hand hewn effect, which comprises:
   a. passing the panel lengthwise with respect to transversely spaced rigid cutting tools stationed along the path of said panel;
   b. rotating said tools about an axis transverse to the length of the panel;
   c. advancing said tools intermittently by hydraulic means toward the moving panel to gouge out spaced areas of the adjacent surface thereof in a predetermined pattern;
   d. and controlling the hydraulic means to position the tools by a series of valves and a rotatable program cylinder with control means coupled to the valves.

2. A method as claimed in claim 1 wherein said tools are continuously rotated about their own axes.

3. A method as claimed in claim 1 wherein said rotatable program means is coupled to the means which moves the panel lengthwise.

4. A method as claimed in claim 1 wherein said tools are independently movable with respect to each other.

* * * * *